[11] 3,597,647

[72] Inventor Michael L. Rishton
Reading, Mass.
[21] Appl. No. 868,727
[22] Filed Oct. 23, 1969
[45] Patented Aug. 3, 1971
[73] Assignee Dyonics, Inc.
Woburn, Mass.

[54] FILAMENT RADIATION SOURCE
15 Claims, 15 Drawing Figs.
[52] U.S. Cl. .................................................. 313/110,
313/112, 313/174, 313/220, 313/222, 350/96 R
[51] Int. Cl. .................................................. H01j 5/16
[50] Field of Search .......................................... 313/110,
111, 112, 113, 116, 220, 222, 315, 174; 350/96

[56] References Cited
UNITED STATES PATENTS
3,216,477  11/1965  Devine .......................... 350/96 X .......................... 313/315
FOREIGN PATENTS
747,917  10/1944  Germany ...................... 350/96

*Primary Examiner*—Raymond F. Hossfeld
*Attorney*—John Noel Williams

ABSTRACT: Filament radiation source in which an elongated collector-emitter rod protrudes through the bulb envelope, with a collector face immediately adjacent the filament inside the envelope and an emitting face spaced substantially beyond the envelope wall. Deposit of filament substance on the collecting face is avoided in light source applications by use of the halogen cycle. The source is shown mounted by the rigid rod for simple, accurate positioning, interfacing at a cool region with fiber optic light pipes. Axisymmetric relation of the collector emitter to the remainder of the bulb enables fitting into small cylindrical housings. Side mounting of the rod enables multiple rods to be employed.

PATENTED AUG 3 1971 3,597,647

FILAMENT RADIATION SOURCE

This invention relates to filament radiation sources and devices for use therewith.

Principal objects of the invention are to increase the amount of useful radiation obtained from a filament bulb; facilitate the delivery of radiation from filament to fiber optic or similar systems; avoid the requirement of reflectors; and simplify both the construction of such systems and maintenance thereof.

According to the invention there is matched to the filament a transparent, high refractive index rod or rodlike collector-emitter (preferably a rigid member useful for mounting) which is joined or fused to the bulb envelope, and which extends inwardly of the envelope wall to a radiation accepting end face which is positioned close to the filament. The other emitting end of the rod protrudes outwardly beyond the envelope, positioned to deliver the radiation picked up from the filament. A light pickup system, e.g. a polished end face of a rod or fiber bundle, is releasably positioned by a fitting adjacent the light-emitting end of the collector-emitter and transmits the light to the desired point of use.

The action of the filament at least in part keeps the accepting face of the collector-emitter clean of filament substance to assure high output of the system during its life. Advantageously the filament comprises tungsten, a halogen is provided within the envelope, and the bulb is adapted to operate at high temperatures to achieve the known halogen cycle, thus keeping the inner end of the collector-emitter clean.

Other objects and features will be understood from the description herein. In the drawings:

FIG. 1b is a top view taken on line 1b of FIG. 1a;

FIG. 3 is a view similar to FIG. 1a of the collector-emitter of another embodiment while

FIG. 4 is a longitudinal cross-sectional view of another embodiment while

Figure 1:
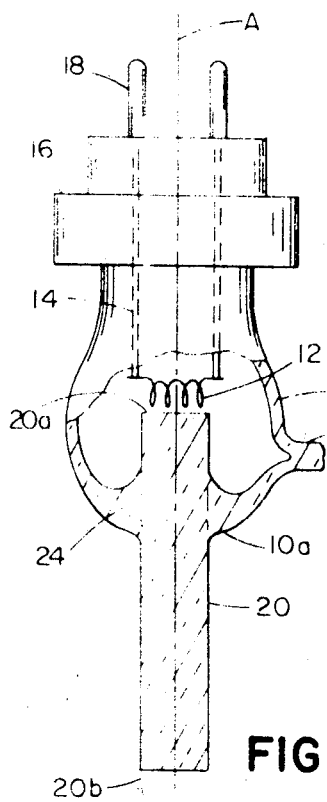
FIG. 1 is a side view of an embodiment of a filament bulb according to the invention.
Figure 1A:
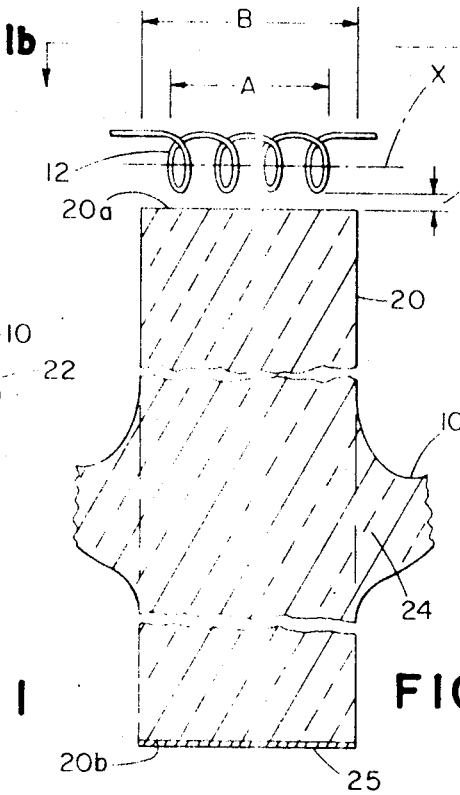
FIG. 1a is a partially broken away side view on an enlarged scale of the rod and filament portion of the bulb of FIG. 1.
Figure 1B:
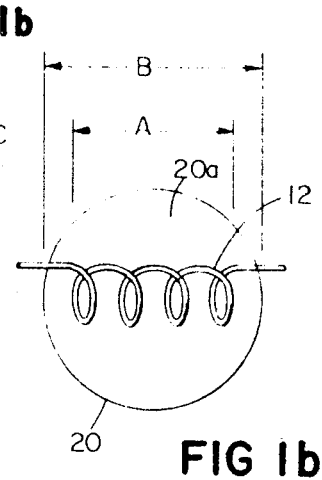

Referring to the embodiment of FIGS. 1, 1a and 1b a radiation source is shown comprising an envelope 10, and a resistance-heated filament 12 mounted by posts 14 to base 16, connected to terminals 18. Through the portion of the envelope 10a opposite from base 16 protrudes collector-emitter rod 20, having a collector face 20a spaced inwardly from the envelope walls, positioned immediately adjacent filament 12, with clearance C. The plane of this face is substantially parallel to the axis X of the filament. As shown in FIGS. 1a, 1b the rod 20 here is round in cross section, having a diameter B slightly greater than the length A of the profile or aspect of the filament 12. The rod is transparent to the radiation and has a relatively high index of refraction compared to the air which contacts its sides. The rod 20 extends outwardly along the general axis of symmetry A of the device to an emitting face 20b which is spaced beyond the envelope.

This embodiment comprises a light source suitable for cold light applications such as illumination in surgery, microscopy or photographic projections. To this end both envelope 10 and rod 20 are of quartz or fused silica, (high temperature, low coefficient of expansion materials) the filament is tungsten and the envelope, initially evacuated through port 22, is filled with an atmosphere of a halogen gas, for operation according to the known halogen cycle. This cycle may be visualized as follows: tungsten particles vaporized at the filament, combine with the halogen. The heat of the tungsten surface thereafter causes disassociation of this compound, with deposit of the tungsten back on the filament surface. Collector face of the collector-emitter remains clean when positioned as close as 0.5 mm. to the filament.

The spaced-apart emitting end 20b of the rod 20 is relatively cool and permits interfacing with components which cannot be positioned close to the hot filament, for instance epoxy-bonded fiber ends of an optic fiber system. At the same time, due to the proximity of collector face 20a to the filament and the known light-transmitting qualities of rodlike members a very intense light is delivered out of emitting end 20b. A dichroic coating 25 (FIG. 1a) is provided at the emitting end to prevent transmission of infrared, thus producing cold light.

Figure 8:
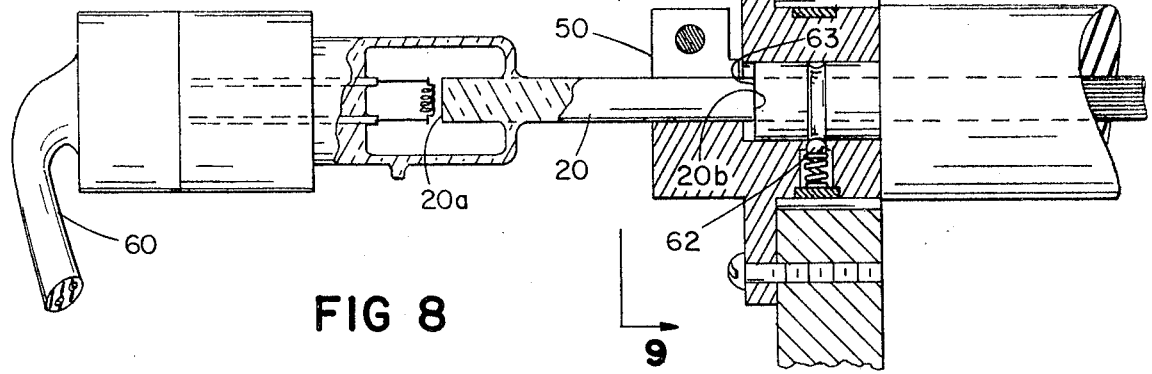
FIG. 8 is a cross-sectional view of a lighting device according to the invention.

The rod is fused at 24 to the envelope 10, is rigid and of a length sufficient to provide for accurate mounting of the filament source by the rod in a lighting system, to be described, see FIG. 8.

Figure 10:
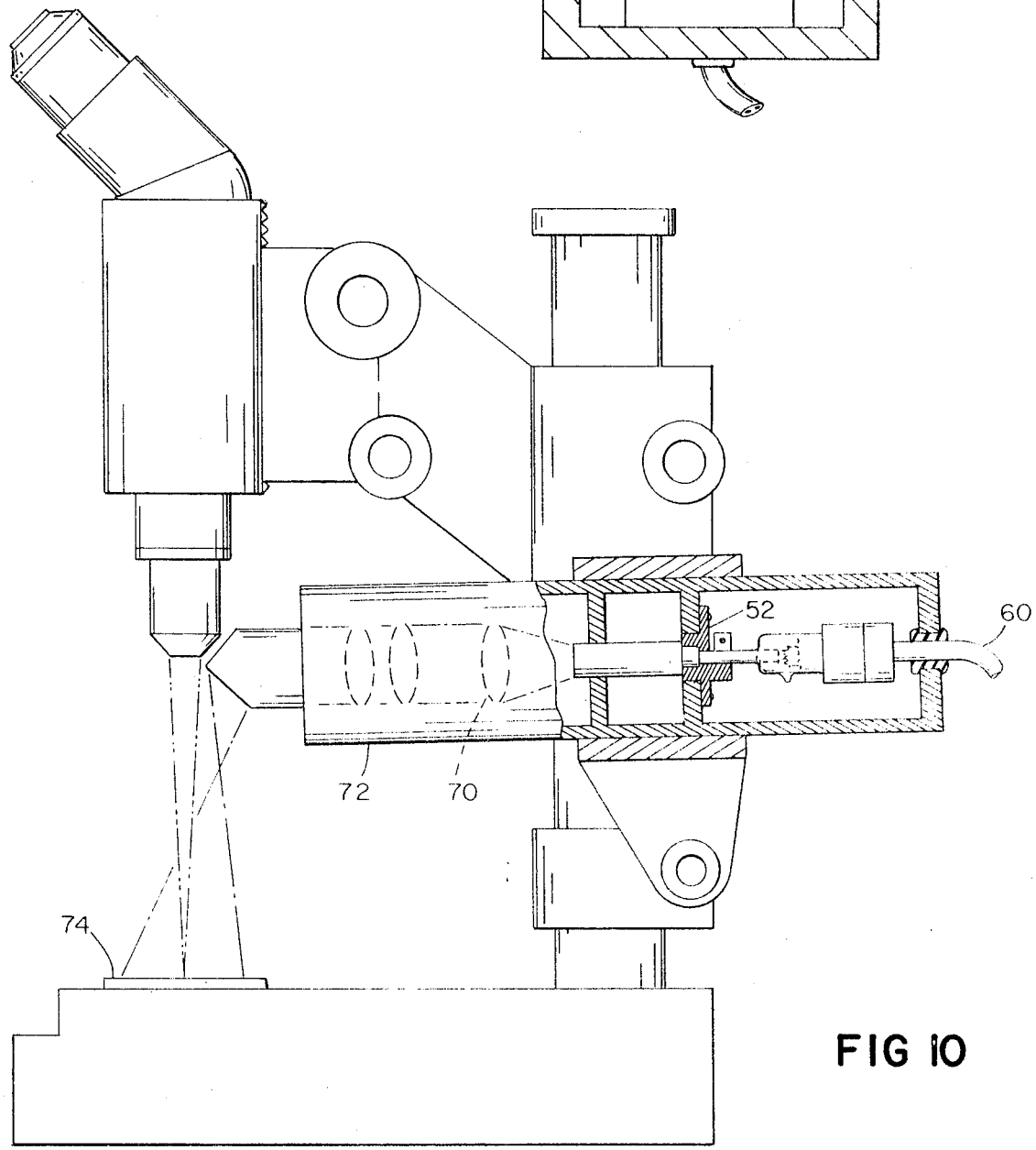
FIG. 10 is a diagrammatic view of a microscope illumination system according to the invention.

The axisymmetric embodiment of FIG. 1 is useful in the small confines of cylindrical housings commonly associated with lighting systems, see FIG. 10.

Figure 2:
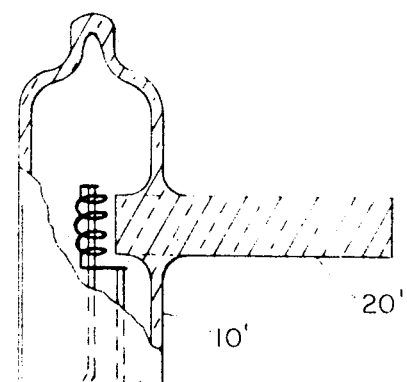
FIG. 2 is a side view of a second embodiment of a filament bulb according to the invention.

The embodiment of FIG. 2 is similar to FIG. 1 except the collector-emitter 20' extends through the sidewall of envelope 10'. Without a dichroic coating this embodiment can serve as a concentrated source of infrared radiation for use e.g. as a heat gun for softening and heat-shrinking plastic insulation on connectors during assembly of electric circuits.

Figure 3A:
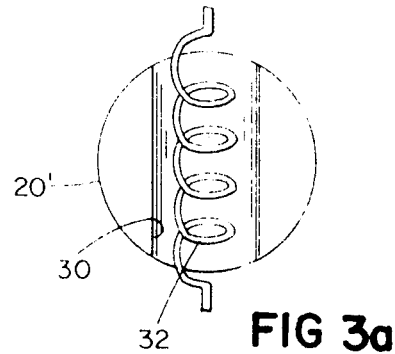
FIG. 3a is an end view along line 3a of FIG. 3.
Figure 3:
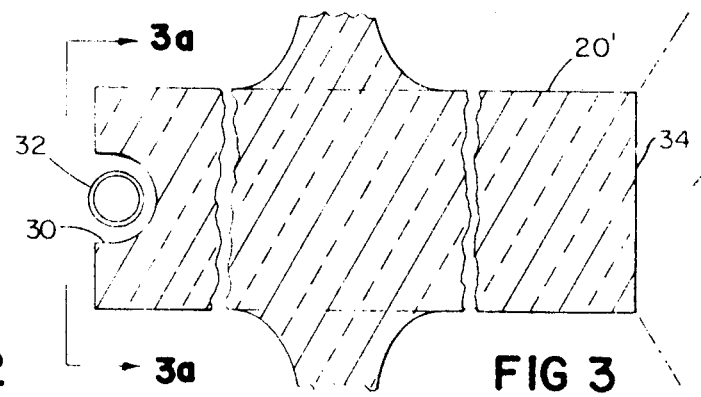

In the embodiment of FIGS. 3 and 3a a groove 30 is formed in the collecting face of the collector-emitter 20' in which is inserted filament 32, the resulting large quantity of light collected being dispersed widely from the emitter face 34, see FIG. 3, useful e.g. in ornamental fiber optic displays.

Figure 4:
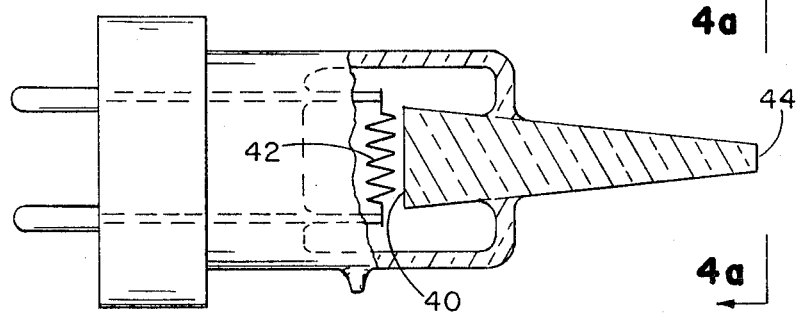
Figure 4A:
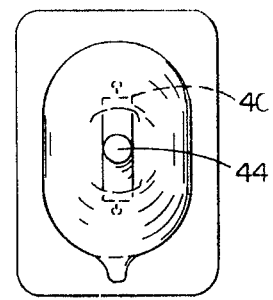
FIG. 4a is an end view taken on line 4a of FIG. 4.

In the embodiment of FIGS. 4 and 4a the collector-emitter has a rectangular collector face 40 disposed adjacent a filament 42 which presents a substantially rectangular aspect. The rod changes its cross section along its length terminating in a circular emitting face 44. Thus, here again the collector face of the collector-emitter is tailored to the filament to optimize light collection from the filament, while its opposite end is tailored for emission to an optical system.

Figure 5:
FIGS. 5, 6 and 7 are side views of alternative configurations of the emitter end of collector-emitters used in the invention.

FIG. 5 illustrates an emission face 20c in the form of spherical lens integral with the elongated rod, suitable e.g. for forming an aerial image for use in a light-condensing system.

Figure 6:
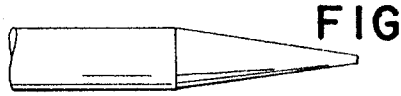

FIG. 6 shows the outer portion of a rod tapered to approach a point source presentation of the light, useful e.g. in other condensing systems.

Figure 7:
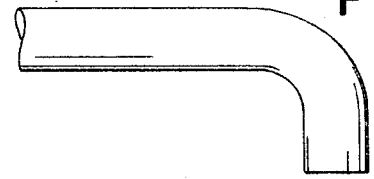

FIG. 7 shows that the collector-emitter rod may be bent to conform to special requirements.

In FIG. 8 there is shown a device for mounting sources according to the invention. The outer part of collector-emitter rod 20 is rigid and of suitable length (e.g., having a diameter on the order of one-tenth of an inch) and strength (e.g., having a diameter on the order of one-tenth of an inch) to serve as the means for mounting the entire source. To this end circular clamp 50 (see also FIG. 9) releasably grips rod 20 around its circumference. The clamp in turn is mounted by ring 52 to housing wall 54. By this means the lamp is mounted, being connected to a power supply by flexible cable 60. The emitting face 20b is exposed within the fitting.

In the embodiment shown a hollow extension of the fitting is axially aligned with the end face 20b of the rod. In this extension is inserted, thusly aligned, the light-receiving end 63 of a bundle of optical fibers. This bundle may terminate at its other end in single or multiple light-emitting ends. Because of the remoteness of the fibers from the hot filament, the epoxy adhesive which binds their light-receiving ends together in a polished receiving face is not damaged by the heat of the source, while at the same time the bundle receives light as if it terminated within the hot envelope, immediately adjacent the filament, mapping the aspect of the filament.

A spring detent 62 is shown in fitting 52 permitting release of the fiber bundle.

Figure 9:
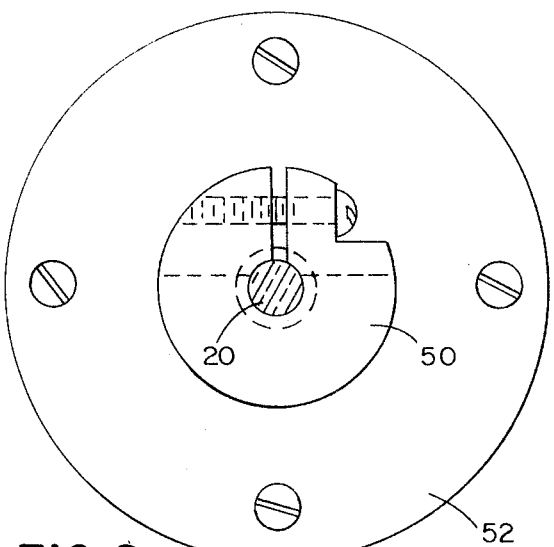
FIG. 9 is an end view taken on line 9-9 of FIG. 8.

In the embodiment of FIG. 10 the light bulb is mounted by its collector-emitter rod similarly to FIG. 9. The light travels from the rod through an optic system 70, within a cylindrical housing 72 to a prism, thence to illuminate a slide 74 of a microscope. Note that mounting of the source by the rod can automatically properly position the light source relative to the optic system, thus avoiding the need for an optical technician to position the bulb.

Figure 11:
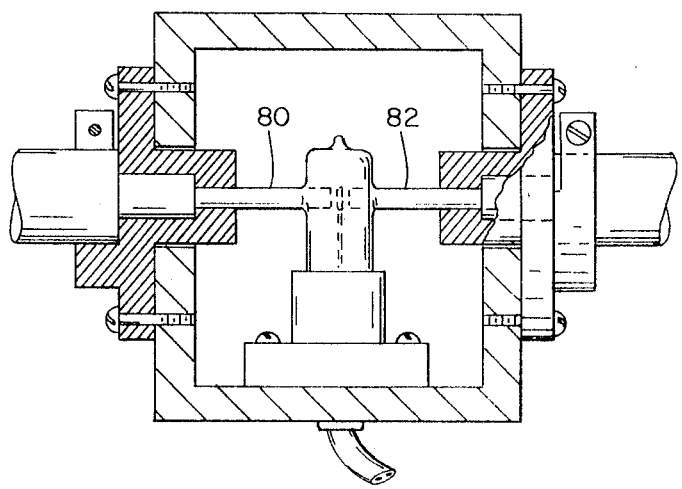
FIG. 11 is a view of a multi collector-emitter embodiment of the invention.

In the embodiment of FIG. 11, two collector-emitters 80 and 82 are related to opposite sides of the filament, within and fused to the envelope, as described above. Such an arrangement is especially suited for situations requiring large quantities of light, e.g. in multiple light pipe surgical illumination or in card or film readers for computers.

In a typical embodiment, referring back to FIGS. 1, 1a and 1b the collector-emitter rod may have a length of 1 or 2 inches, (suitable for mounting of the source) and a diameter of 0.156 inch, in bulbs rated for instance at 8.5 volts, 62 watts (GE 1962) or 30 volts, 150 watts (Sylvania FBT).

Numerous variations of the specific details will occur and are within the spirit and scope of the invention.

What I claim is:

1. A source of electromagnetic radiation comprising an envelope, a resistance-heated filament disposed within and spaced inwardly from the walls of the envelope, and an elongated transparent collector-emitter extending through and fused to the envelope, the collector-emitter having a radiation-accepting face, positioned immediately adjacent the filament to collect radiation therefrom and be maintained clean of deposit of filament substance at least in part due to the action of the filament and said collector-emitter having a radiation-emitting face spaced outwardly from said envelope.

2. The source of claim 1 wherein said envelope contains a regenerative getter substance adapted to react with particles of filament substance vaporized from the filament to form a filament-getter compound that is subject to disassociation at the filament surface due to the heat thereof, whereby said filament substance may be deposited back upon the filament.

3. The source of claim 2 in the form of a halogen-cycle-type light source wherein said filament is comprised of tungsten and said regenerative getter substance comprises a gaseous atmosphere of a halogen.

4. The source of claim 1 wherein said collector-emitter is of elongated rod form of a cross-sectional area corresponding to the aspect of the filament.

5. The source of claim 1 adapted to serve as a light source for a fiber optic bundle and including a fitting comprising a clamp portion which engages the outer portion of said collector-emitter and means to relatively position the light-accepting face of the bundle in receiving relation to the light-emitting face of said collector-emitter.

6. The light source of claim 5 wherein the fibers of said bundle at the accepting face are bonded together by heat-softenable adhesive and said collector-emitter is sufficiently long to provide an outer end cooler than the softening temperature of said adhesive.

7. The light source of claim 1 wherein the portion of said emitter-collector outside of said envelope comprises a rigid structural member of length sized to be gripped by a clamp.

8. The light source of claim 7 wherein said collector-emitter is adapted to support said envelope.

9. The light source of claim 8 wherein said collector-emitter is a rod having a diameter on the order of one-tenth of an inch and a length beyond said envelope on the order of 1 inch.

10. The light source of claim 7 in combination with a mounting means comprising a clamp portion to engage the outer portion of said collector-emitter and position it to direct light into an optic system.

11. The source of claim 1 including a base, said envelope having one end secured to the base, said collector-emitter protruding through the portion of the envelope opposite of said base, adapted for mounting in a substantially cylindrical optical system housing.

12. The source of claim 1 including a base, said envelope having one end secured to the base, a plurality of said collector-emitters, at least one protruding through a sidewall of said envelope adjacent said base.

13. The source of claim 1 wherein said filament is adapted to emit infrared radiation and said collector-emitter is adapted to transmit and emit said radiation, to serve as a source of heat.

14. The source of claim 3 wherein said envelope and said collector-emitter are comprised of fused silica or quartz and a substance is associated with said collector-emitter to prevent transmission of infrared and provide a source of cold light.

15. In combination with an incandescent light source having a rigid collector-emitter rod protruding through and secured to the envelope, and extending outwardly therefrom, a light source device comprising means to releasably grip and position the rigid collector-emitter rod of the light source to expose the light-emitting face thereof and means to releasably grip and position the light-receiving face of a fiber optic bundle in position to receive light from said rod.

UNITED STATES PATENT OFFICE
CERTIFICATE OF CORRECTION

Patent No. 3,597,647  Dated August 3, 1971

Inventor(s) Michael L. Rishton

It is certified that error appears in the above-identified patent and that said Letters Patent are hereby corrected as shown below:

Column 2, lines 59-60, change "(e.g., having a diameter on the order of one-tenth of an inch)" to --(e.g., on the order of one inch beyond the envelope)--.

Signed and sealed this 13th day of June 1972.

(SEAL)
Attest:

EDWARD M. FLETCHER, JR.
Attesting Officer

ROBERT GOTTSCHALK
Commissioner of Patents